(12) United States Patent
Best et al.

(10) Patent No.: US 8,407,693 B2
(45) Date of Patent: Mar. 26, 2013

(54) MANAGING PACKAGE DEPENDENCIES

(75) Inventors: Steven Francis Best, Georgetown, TX (US); Robert James Eggers, Jr., Austin, TX (US); Janice Marie Girouard, Austin, TX (US); Kevin William Monroe, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 12/135,622

(22) Filed: Jun. 9, 2008

(65) Prior Publication Data

US 2009/0307684 A1 Dec. 10, 2009

(51) Int. Cl.
*G06F 9/445* (2006.01)
(52) U.S. Cl. ........................... 717/174; 717/169
(58) Field of Classification Search .................... 717/174
See application file for complete search history.

(56) References Cited

U.S. PATENT DOCUMENTS 7,137,112 B2 * 11/2006 Lovvik et al. ............... 717/166
2002/0144248 A1 * 10/2002 Forbes et al. ............... 717/167
2004/0168152 A1    8/2004 Kramer
2007/0006217 A1 *  1/2007 Tammana .................... 717/174
2007/0074197 A1    3/2007 Buckley et al.

FOREIGN PATENT DOCUMENTS

GB        2345994 A1    7/2000

* cited by examiner

*Primary Examiner* — Don Wong
*Assistant Examiner* — Deric Ortiz
(74) *Attorney, Agent, or Firm* — Yee & Associates, P.C.; Steven L. Bennett

(57) ABSTRACT

A technique for managing package dependencies for an application installation. A set of used files for the application and a package for a respective file in the set of used files are identified, and names of the identified packages are added to an original package list of package names for the application, wherein the original package list defines package dependencies. Responsive to a determination that the identified packages can be located, that the files within the identified packages can be found, and that the files within the identified packages were used, the original list of package names for the application is updated to form an updated list of managed package dependencies. A difference list between the updated list and the original list of package names is created, and the application is selectively installed using a combination of the original list of package names and the difference list.

18 Claims, 3 Drawing Sheets

MANAGING PACKAGE DEPENDENCIES

BACKGROUND OF THE INVENTION

1. Field of the Invention

The present invention relates generally to an improved data processing system and more specifically to a computer implemented method, an apparatus, and a computer program product for managing package dependencies for an application installation.

2. Description of the Related Art

Today, software dependencies, usually required during installation, are typically manually entered into data files. For example, an offering originally known as the Red Hat® Package Manager, available from Red Hat Inc., and abbreviated simply hereafter as RPM or as rpm is a package management system that stores software dependency information in data files. Reference to RPM now infers use of a software package file format and software packaged in accordance with the RPM format. Although the RPM package manager was intended primarily for Linux™ distributions, the file format of the package manager has become the package format of the Linux base.

Although originally developed by Red Hat for Red Hat Linux, RPM is now typically used by many other Linux distributions. The package manager has also been ported to operating systems other than Linux, such as Novell® NetWare®, available from Novell Inc., and AIX®, available from IBM®.

In the Linux based system, the package manager "package.spec" file contains a "REQUIRES" field in which the software package creators enter the package dependency information. However, this methodology tends to be error prone. For example, errors occur because needed packages can easily be left out of the list, or files that are not truly required can be added to the list when not needed or used. Typically, if the package author is unclear about file and package dependencies, the author will choose to be conservative and include a questionable package or file.

An additional problem related to current package dependency tools is that the tools typically do not take into account the portion of the package actually used. For example, a component known as the "tpm-trousers" rpm in Linux today can be built with a configuration option specifying no graphical user interface, or "gui=none." However, the package dependency tools fail to accommodate this option as a configuration alternative. With this support in mind, a novice user following the stated package dependencies would load or update the extremely sizable "X11/motif/etc" packages, including the associated sizable font files. These packages may in turn require yet further package installations. As a consequence, a "waterfall" of potentially useless package dependencies, that may affect the existing applications, can typically be triggered in this form of packaging environment. The end result may not be what was originally expected, or the result may be unpredictable and situation-dependent.

BRIEF SUMMARY OF THE INVENTION

According to one embodiment of the present invention, a computer implemented method for managing package dependencies for an application installation is provided. The computer implemented method comprises identifying a set of used files for the application, identifying a package for a respective file in the set of used files to form identified packages, adding names of the identified packages to an original package list of package names for the application, wherein the original package list defines package dependencies, and determining whether the identified packages can be located. The computer implemented method, responsive to a determination that the identified packages can be located, determines whether files within the identified packages can be found, responsive to a determination that the files within the identified packages can be found, determines whether files within the identified packages were used, and responsive to a determination that the files within the identified packages were used, updates the original list of package names for the application to form an updated list of managed package dependencies. The computer implemented method further creates a difference list between the updated list and the original list of package names and selectively installs the application using a combination of the original list of package names and the difference list, according to the package dependencies.

DETAILED DESCRIPTION OF THE INVENTION

Figure 1:
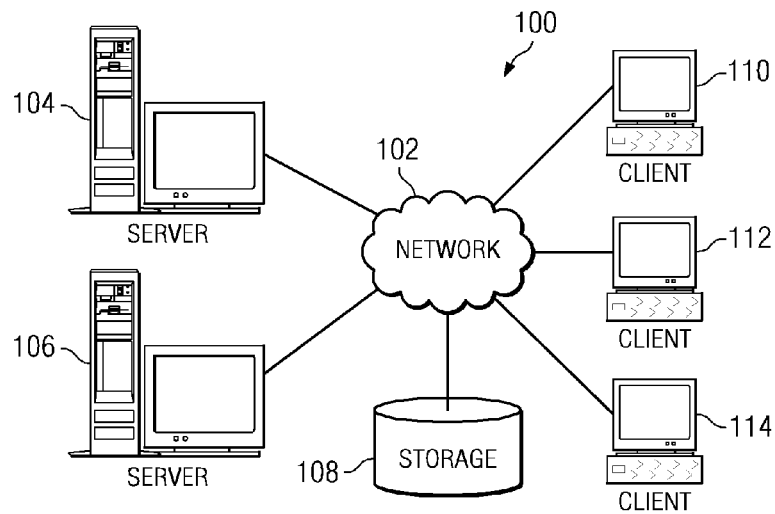
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
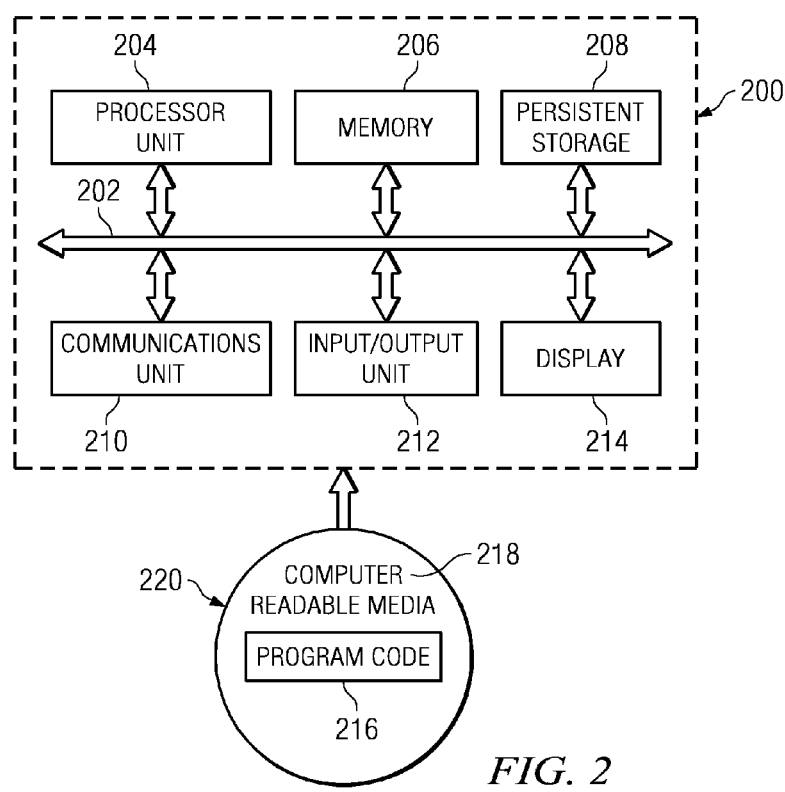
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Using the example system 100 of FIG. 1, an application software install may be planned for client 114 through network 102 based on software maintained on server 104. The addition of a data field, as a file attribute, that records an entry for each application that uses the file allows the operating system to track the usage of the file. The desired application can be started on server 104 and the file usage information obtained. For each file used, a package manager can be requested to provide the name of all packages associated with the used files. The packages named may then be combined with the application package of the desired application. The result is then a customized list of required packages. The resulting package list may also be further pruned to eliminate packages or files known to be non-essential. A difference list of packages may also be created by comparing the original list of packages with the updated, customized list of packages. The customized package, the original list of packages or a combination of the original list of packages and a difference list of packages, each containing a set of packages, may then be selectively installed on client 114 to reduce the impact of the installation or update process. In this example, a set of packages may comprise one or more packages as required.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
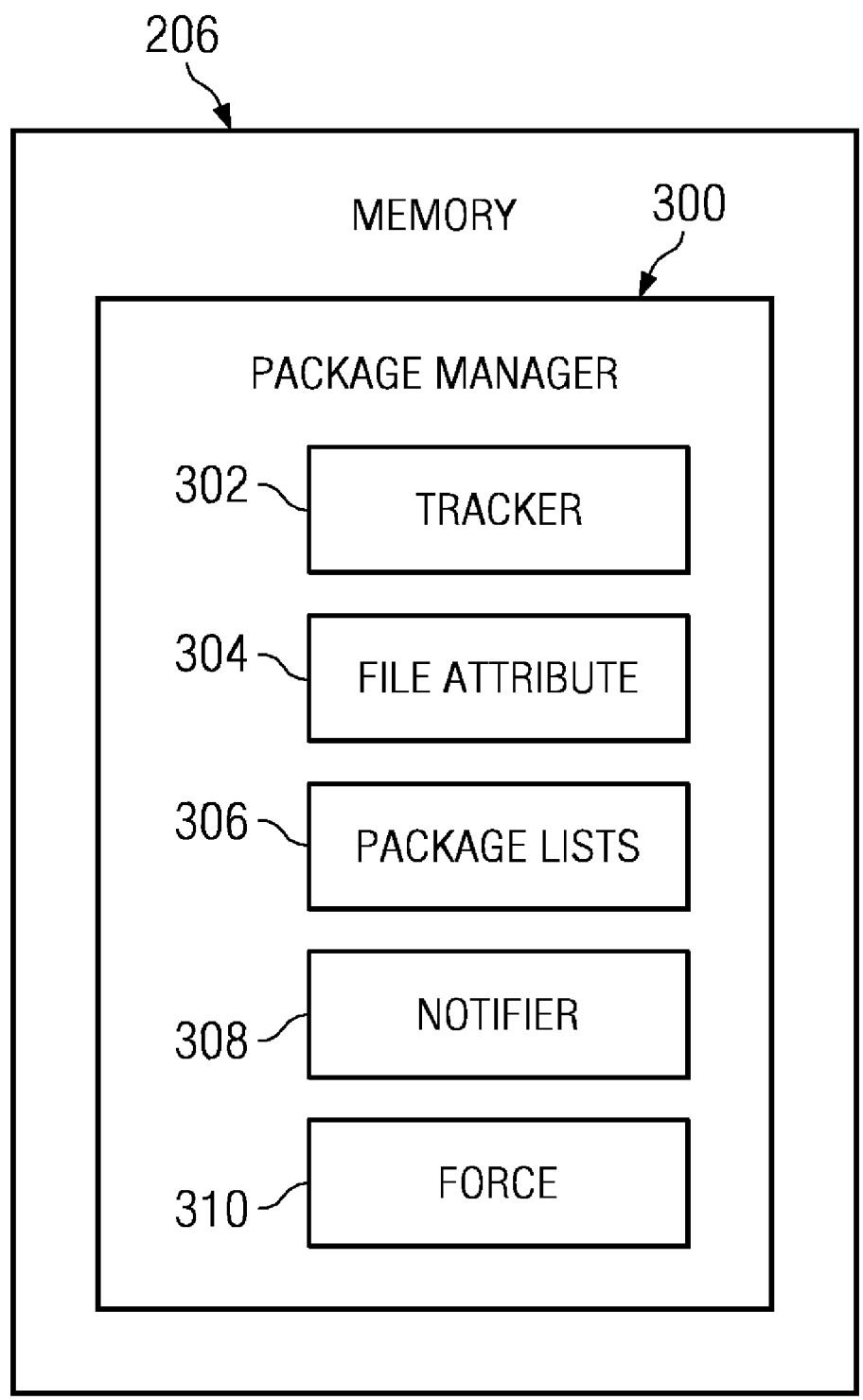
FIG. 3 is a block diagram of components of a package manager in accordance with illustrative embodiments.

With reference to FIG. 3, a block diagram of components of a package manager in accordance with illustrative embodiments is shown. In this example, package manager 300 is depicted within memory 206 of system 200 of FIG. 2, but may reside in other locations such as storage 108 of FIG. 1 until needed. Package manager 300 comprises a number of components including tracker 302, file attribute 304, package lists 306, notifier 308 and force 310.

Package manager 300 provides a common focal point for installation and maintenance of the set of related components that form the package manager. Tracker 302 provides a capability for the operating system or file system to obtain and record file usage information needed to define which files are used by an application. The tracking modification may be applied to the operating system or the file system as appropriate. On each occurrence of a file open, the identity of the requesting application would thus be captured.

File attribute 304 is a corresponding entity in the file system to provide the place holder for the file usage information. The file usage information may then be captured or tracked and analyzed to determine which applications used the file. File attribute 304 may be similar to another attribute that provides date-accessed or date-modified information. File attribute 304 collects a "used by" form of information to record which component used the specific file.

Package lists 306 provide a capability of storing entries comprising elements of package information for an application. For example, package lists 306 may provide information related to the several packages comprising a graphical user interface-based application on a specific instance of a system. When the same graphical user interface-based application is installed on another different instance of a system, the package list may be different. There may be a core set of packages within the package that is the same, while other packages vary by system.

Notifier 308 provides a capability to send notices or messages to routines or users. The notices provide the status of invoking package manager 300. For example, when producing a package list and a file indicated as being used in a package cannot be located, an error condition may be raised. The error condition may allow for selective processing of the file or package entry and a prompt may be issued by notifier 308.

Force 310 is a command or function interface providing a capability to override or ignore information in a package. Force 310 could provide for selective processing of a provided package list. For example, a "force list A, B" may be used to implement package list "A" with optional processing of package or file "B."

In one example, to facilitate the creation of package dependencies that are unique for an environment, a procedure may be defined. For example, add a new data field to the application of interest, and execute the application, by launching the application in a test mode. Upon completion of the launch, for every binary file included in an install package, find all of the files that were "used by" each of the binary files. For each of those files, use an rpm tool such as "rpm-qf/dirname/filename" to extract the name of the package that provides this file and add this package to a list of all packages "used by" the binary. The combined lists for each binary in the rpm form a customized package dependency list for the environment in which the application test was performed.

Initially, the software may be installed using an all inclusive list of packages as available currently, or alternatively, by using existing package dependency lists. Once the "customized subset" is defined for each package, all files listed in the original package dependency (superset) list that are not listed in the customized subset list may be trimmed to reduce the original list. Future installations or updates to this host, or to any hosts installed with this new or modified rpm, would be implemented by the new dependency list in which the customized list became a part of the rpm.

The difference between the original package dependency list, and the "customized subset" could therefore become a list of files that can be permanently eliminated from the dependency list. Alternatively, the current rpm tools may be enhanced to provide a capability for listed packages to be ignored. Use of a package manager "—force list" option could allow for a list of files in the dependency list to be ignored, in contrast to current implementations in which all dependencies are ignored. The "—force list" option could automatically be created from the original difference list or a customized delta list. Using the previous "tpm" example, using the "force" option in this manner would be the equivalent of having "—force=X11,motif,xdm" automatically added to the rpm installation command by the disclosed dependency gathering technique.

The advantage of the "—force" implementation in this example is that this same "—force list" mechanism may provide a capability for reducing rpm dependencies. For example, when the rpm package is delivered, an "rpm.config" file similar to UNIX™ kernel configuration "Kconfig make file" could be presented to the user to indentify how the user wants to install the system. The definitions in the configuration file would then be used to determine if an existing package dependency should be ignored or enforced, and the appropriate package list could be then input to the "—force" option. The technique provides an additional alternative for users for overriding package dependencies by "—force list" to manually overwrite the installation dependency of select files.

Customized dependency lists may be extremely useful in environments where specific, unique installations are required. The technique may also be used to alleviate issues related to excessive package updates that typically cause havoc on the target systems. Reducing the files and packages to the actual files and packages used results in more effective processing and reduced time to install.

Figure 4:
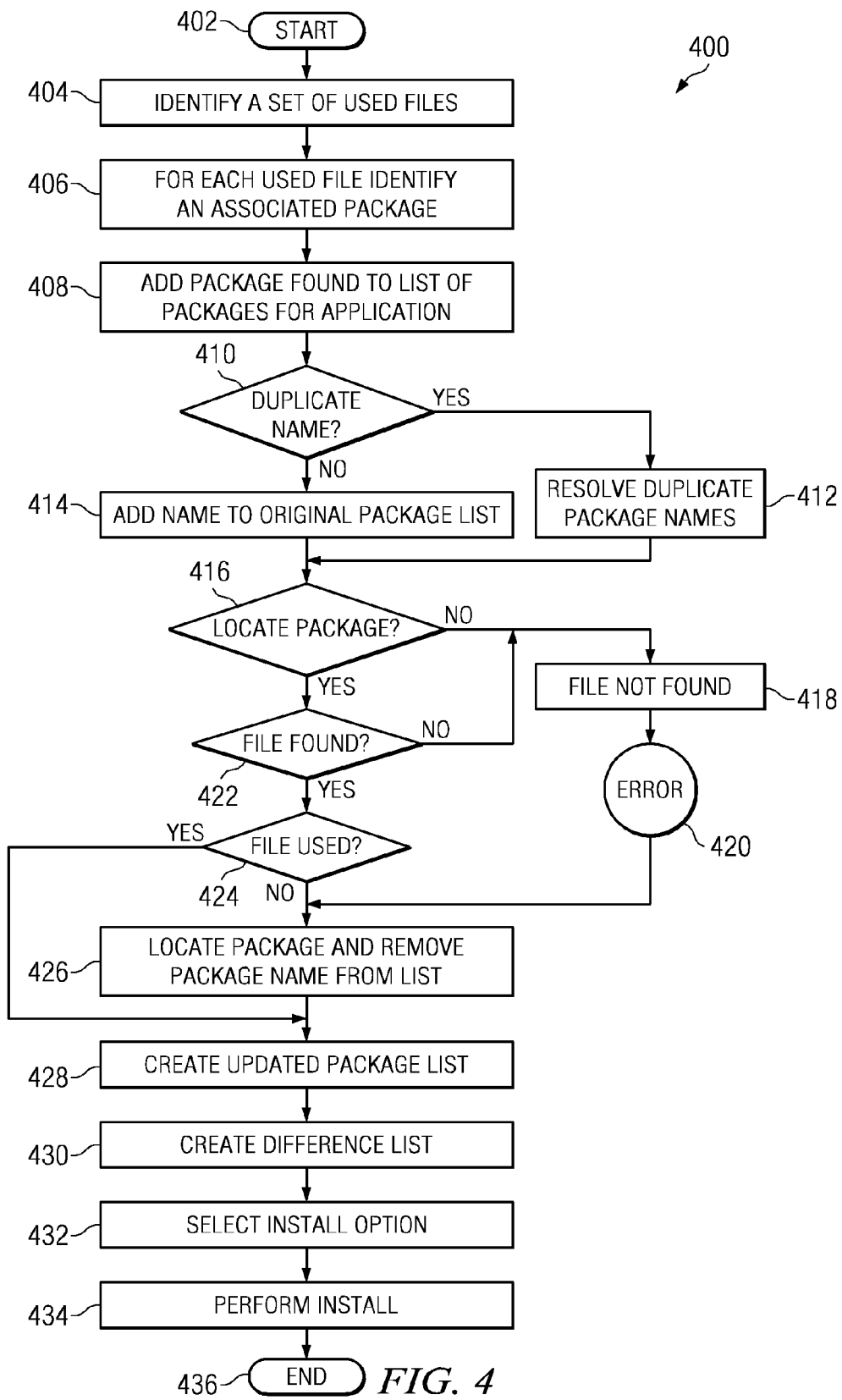
FIG. 4 is a flowchart of a package management process in accordance with illustrative embodiments.

With reference to FIG. 4, a flowchart of a package management process in accordance with illustrative embodiments is shown. Package management process 400 is an example of a package management process implementation of package manager 300 of FIG. 3.

Package management process 400 may be used to identify a set of files and associated packages that are used by an instance of an application interest. Package management process 400 starts (step 402) and uses a capability to identify a set of used files related to the application of interest (step 404). For each used file, identify an associated package in which the file is found (step 406). The identification may typically be obtained by calling a package manager service. For each identified package, add the package to the list of packages for the application of interest (step 408). The original package list defines the package dependencies.

A determination is made whether the added name of the package is a duplicate name (step 410). If the added package name is a duplicate, a "yes" result is obtained. If the added package name is new, a "no" result is obtained. When a "yes" result is obtained in step 410, a duplicate name has been determined and a resolve duplicate package names action must be performed (step 412) and proceed to step 416. Typical resolution of duplicate package names results in the deletion of one entry to leave one instance remaining.

When a "no" is obtained in step 410, an add name to the original package list is performed (step 414). The name of the identified package is thus added as a new entry in the list of package names for the application of interest.

An attempt is made to locate the package just added (step 416). The locate action may entail use of known services such as a directory or catalog service or other usual means to find a file on a system. If the package can be located, a "yes" is obtained. If the package cannot be located, a "no" is obtained. When a "no" result is obtained in step 416, a file not found or similar message is constructed (step 418). The message is then passed to an error handling service which is capable of transmitting a message to a requester (step 420) with process 400 proceeding to step 426.

When a "yes" is obtained in step 416, a named package was located and an attempt to find the files within the package occurs (step 422). If the files are found, the result is a "yes." When the files cannot be found, the result is a "no." When a "no" is obtained in step 422, a file not found or similar message is constructed (step 418). The message is then passed to an error handling service which is capable of transmitting a message to a requester (step 420) with process 400 proceeding to step 426. An operation locates the package in which the file is referenced, and removes the package name from the list of package names (step 426). The package is removed because the file referenced is not available.

When a "yes" is obtained in step 422, a "file used" determination is made to verify whether the files in the package were used (step 424). If the files were not used, a "no" result is obtained. If the files were used, a "yes" result is obtained. When a "no" result is obtained in step 424, processing loops back to step 426 as before to locate the package of the referenced file and remove the package from the list.

When a "yes" result is obtained in step 424, the process produces an updated package list of managed package dependencies using the current information for the files and packages just processed (step 428). The updated package list obtained from step 428 is then compared with the original package list of step 414 to create difference list (step 430).

The difference list represents a delta of the files and packages that are not required for the installation of the application as determined by the previous processing. A selective install using the original package list and the difference list or other option is then made (step 432). The selection is made from among the choices of using the original package list, the updated package list, and the original package list with the difference list being applied at install time. The choices provide for an original install using the original package list. The updated list provides for a new install based on determined resources. The install using the original package list and the difference list allows for overriding the previous installation by ignoring the files in the difference list while still keeping the original package list available. The selected install is performed (step 434) and process 400 terminates thereafter (step 436).

Illustrative embodiments provide the addition of a data field, as a file attribute, that records an entry for each application that uses the file, allowing the operating system to track the usage of the file. The desired application can be started and the file usage information obtained for the application. For each file used, a package manager can then be requested to provide the name of each package associated with the used files. The packages named may then be combined with the application package of the desired application. The result is then a customized list of required packages. The resulting package list may also be further pruned to eliminate packages or files known to be non-essential or redundant. The customized package containing a set of packages may then be installed on a system to reduce the impact of the installation or update process. In this example, a set of packages may comprise one or more packages as required.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing package dependencies for an application installation, the computer implemented method comprising:
    identifying a set of used files for the application;
    identifying a package for a respective file in the set of used files to form identified packages;
    adding names of the identified packages to an original package list of package names for the application, wherein the original package list defines package dependencies;
    determining whether the identified packages can be located;
    responsive to a determination that the identified packages can be located, determining whether files within the identified packages can be found;
    responsive to a determination that the files within the identified packages can be found, determining whether the files within the identified packages were used by the application;
    responsive to a determination that the files within the identified packages were used, updating the original list of package names for the application to form an updated list of managed package dependencies;
    creating a difference list between the updated list and the original list of package names; and
    selectively installing the application using a combination of the original list of package names and the difference list according to the package dependencies.

2. The computer implemented method of claim 1, wherein adding names of the identified packages to an original list of package names for the application further comprises:
    adding names of identified packages to the original package list for the application;
    determining whether there are duplicate names; and
    responsive to a determination that there are duplicate names, resolving the duplicate names.

3. The computer implemented method of claim 1, wherein determining whether the identified packages can be located further comprises;
    responsive to a determination that the identified packages cannot be located, constructing a file not found message; and
    transmitting the file not found message to a requester.

4. The computer implemented method of claim 1, wherein determining whether files within the identified packages were used by the application further comprises;
    responsive to a determination that files within the identified packages were not used:
        identifying the files as not used files;
        locating packages associated with the not used files to form unused packages; and
        removing the unused packages from the original package list.

5. The computer implemented method of claim 1, wherein creating a difference list between the updated list and the original list of package names further comprises:
    comparing the updated list and the original list of package names; and
    removing duplicate entries.

6. The computer implemented method of claim 1, wherein selectively installing the application further comprises:
    selecting an install option using one of the original list of package names, the updated list, and a combination of the original list of package names and the difference list to drive the installation.

7. A data processing system for managing package dependencies for an application installation, the data processing system comprising:
    a bus;
    a memory connected to the bus, wherein the memory tangibly storing computer executable instructions;
    a communications unit connected to the bus;
    a storage connected to the bus;
    a processor unit connected to the bus, wherein the processor unit executes the computer executable instructions to direct the data processing system to:
    identify a set of used files for the application;
    identify a package for a respective file in the set of used files to form identified packages;
    add names of the identified packages to an original package list of package names for the application , wherein the original package list defines package dependencies;
    determine whether the identified packages can be located;
    responsive to a determination that the identified packages can be located, determine whether files within the identified packages can be found;
    responsive to a determination that the files within the identified packages can be found, determine whether the files within the identified packages were used by the application;
    responsive to a determination that the files within the identified packages were used, update the original list of package names for the application to form an updated list of managed package dependencies;
    create a difference list between the updated list and the original list of package names; and
    selectively install the application using a combination of the original list of package names and the difference list according to package dependencies.

8. The data processing system of claim 7, wherein the step of add names of the identified packages to an original list of package names for the application further comprises:
    add names of identified packages to the original package list for the application;
    determine whether there are duplicate names;
    responsive to a determination that there are duplicate names, resolve the duplicate names.

9. The data processing system of claim 7, wherein determine whether the identified packages can be located further comprises;
    responsive to a determination that the identified packages cannot be located, construct a file not found message; and
    transmit the file not found message to a requester.

10. The data processing system of claim 7, wherein determine whether files within the identified packages were used by the application further comprises;
    responsive to a determination that files within the identified packages were not used:
        identify the files as not used files;
        locate packages associated with the not used files to form unused packages; and
        remove the unused packages from the original package list.

11. The data processing system of claim 7, wherein create a difference list between the updated list and the original list of package names further comprises:
    compare the updated list and the original list of package names; and
    remove duplicate entries.

12. The data processing system of claim 7, wherein selectively install the application further comprises:

select an install option using one of the original list of package names, the updated list, and a combination of the original list of package names and the difference list to drive the installation.

13. A computer program product for managing package dependencies for an application installation, the computer program product comprising:
 a computer usable recordable type medium tangibly embodying computer executable instructions thereon, the computer executable instructions comprising:
 computer executable instructions for identifying a set of used files for the application;
 computer executable instructions for identifying a package for a respective file in the set of used files to form identified packages;
 computer executable instructions for adding names of the identified packages to an original package list of package names for the application, wherein the original package list defines package dependencies;
 computer executable instructions for determining whether the identified packages can be located;
 computer executable instructions responsive to a determination that the identified packages can be located, for determining whether files within the identified packages can be found;
 computer executable instructions responsive to a determination that the files within the identified packages can be found, for determining whether the files within the identified packages were used by the application;
 computer executable instructions responsive to a determination that the files within the identified packages were used, for updating the original list of package names for the application to form an updated list of managed package dependencies;
 computer executable instructions for creating a difference list between the updated list and the original list of package names; and
 computer executable instructions for selectively installing the application using a combination of the original list of package names and the difference list according to the package dependencies.

14. The computer program product of claim 13, wherein computer executable instructions for adding names of the identified packages to an original list of package names for the application further comprises:
 computer executable instructions for adding names of identified packages to the original package list for the application;
 computer executable instructions for determining whether there are duplicate names; and
 computer executable instructions responsive to a determination that there are duplicate names, for resolving the duplicate names.

15. The computer program product of claim 13, wherein computer executable instructions for determining whether the identified packages can be located further comprises;
 computer executable instructions responsive to a determination that the identified packages cannot be located, for constructing a file not found message; and
 computer executable instructions for transmitting the file not found message to a requester.

16. The computer program product of claim 13, wherein computer executable instructions for determining whether files within the identified packages were used by the application further comprises;
 computer executable instructions responsive to a determination that files within the identified packages were not used:
  computer executable instructions for identifying the files as not used files;
  computer executable instructions for locating packages associated with the not used files to form unused packages; and
  computer executable instructions for removing the unused packages from the original package list.

17. The computer program product of claim 13, wherein computer executable instructions for creating a difference list between the updated list and the original list of package names further comprises:
 computer executable instructions for comparing the updated list and the original list of package names; and
 computer executable instructions for removing duplicate entries.

18. The computer program product of claim 13, wherein computer executable instructions for selectively installing the application further comprises:
 computer executable instructions for selecting an install option using one of the original list of package names, the updated list, and a combination of the original list of package names and the difference list to drive the installation.

* * * * *